United States Patent
Day et al.

(10) Patent No.: US 10,270,693 B2
(45) Date of Patent: Apr. 23, 2019

(54) METHOD AND SYSTEM FOR MANAGING NETWORK COMMUNICATIONS

(71) Applicant: TRIA NETWORK SYSTEMS, LLC, Orlando, FL (US)

(72) Inventors: John D. Day, Foxboro, MA (US); Steve Bunch, Orlando, FL (US)

(73) Assignee: Tria Network Systems, LLC, Orlando, FL (US)

( * ) Notice: Subject to any disclaimer, the term of this patent is extended or adjusted under 35 U.S.C. 154(b) by 21 days.

(21) Appl. No.: 15/405,577

(22) Filed: Jan. 13, 2017

(65) Prior Publication Data

US 2017/0126561 A1 May 4, 2017

Related U.S. Application Data

(63) Continuation of application No. 14/211,928, filed on Mar. 14, 2014, now Pat. No. 9,584,633.

(60) Provisional application No. 61/799,708, filed on Mar. 15, 2013.

(51) Int. Cl.
  *H04L 29/06* (2006.01)
  *H04L 12/741* (2013.01)
  *H04L 12/755* (2013.01)

(52) U.S. Cl.
  CPC ............ *H04L 45/74* (2013.01); *H04L 45/021* (2013.01); *H04L 69/22* (2013.01)

(58) Field of Classification Search
  CPC ...... H04L 69/165; H04L 69/08; H04L 69/168
  See application file for complete search history.

(56) References Cited

U.S. PATENT DOCUMENTS

| | | | |
|---|---|---|---|
| 6,092,096 A | 7/2000 | Lewis | |
| 6,269,442 B1 * | 7/2001 | Oberhauser et al. | ............. 713/1 |
| 6,502,131 B1 | 12/2002 | Vaid | |
| 6,728,267 B1 | 4/2004 | Giese | |
| 7,383,321 B2 | 6/2008 | Moyer | |

(Continued)

OTHER PUBLICATIONS

Campista, M.E.M. et al., "Challenges and Research Directions for the Future Internetworking", IEEE Communications Surveys and Tutorials, vol. 16, Issue 2, 2Q2014 (published in IEEE Xplore Oct. 23, 2013).

(Continued)

*Primary Examiner* — Ayaz R Sheikh
*Assistant Examiner* — Debebe A Asefa
(74) *Attorney, Agent, or Firm* — Guntin & Gust, PLC; Douglas Schnabel (57) ABSTRACT

A system that incorporates teachings of the present disclosure may include, for example avoiding data copy and task switching by processing protocol headers of network PDUs as a serial tape to be processed in order such as by a single method. Other processing includes reducing stages and simplifying protocol processing and multiplexing during network communications. Address changing in an active network can be implemented by assigning multiple addresses to an entity so that a new address can replace the old address. Peer-to-peer application searching can be performed among networks that can be accessible or non-accessible networks. Utilizing anycast sets that include selected and alternative addresses to enable immediate or near immediate alternative route selection on failure or congestion. Other embodiments are disclosed.

20 Claims, 11 Drawing Sheets

100

(56) References Cited

U.S. PATENT DOCUMENTS

| | | | |
|---|---|---|---|
| 8,103,797 B2* | 1/2012 | Day | H04L 41/145 |
| | | | 709/248 |
| 9,237,106 B2* | 1/2016 | Ovsiannikov | H04L 47/2441 |
| 2002/0172207 A1 | 11/2002 | Saito | |
| 2003/0014623 A1 | 1/2003 | Freed | |
| 2010/0061391 A1* | 3/2010 | Sindhu | H04L 49/1515 |
| | | | 370/412 |

OTHER PUBLICATIONS

Day, John et al., "Bounding the Router Table Size in an ISP Network using RINA". In Proceedings of the 2011 Second International Conference on Network of the Future, Universite Pierre et Marie Curie, Paris, Nov. 2011.

Day, John et al., "Networking is IPC: A Guiding Principle to a Better Internet". In Proceedings of ReArch'08—Re-Architecting the Internet, Madrid, Spain, Dec. 2008. Co-located with ACM CoNEXT 2008.

Day, John , "Patterns in Network Architecture: A Return to Fundamentals". Published by Prentice Hall (ISBN 0132252422), Dec. 2007.

Mattar, Karim et al., "Declarative Transport: A Customizable Transport Service for the Future Internet". In Proceedings of the 5th International Workshop on Networking Meets Databases (NetDB 2009), co-located with SOSP 2009. Big Sky, MT, Oct. 14, 2009.

Trouva, Eleni et al., "Transport over Heterogeneous Networks Using the RINA Architecture", (2011). Invited Paper, The 9th International Conference on Wired/Wireless Internet Communications (WWIC), 2011.

* cited by examiner

FIG. 12

METHOD AND SYSTEM FOR MANAGING NETWORK COMMUNICATIONS

CROSS-REFERENCE TO RELATED APPLICATIONS

This application is a continuation of U.S. application Ser. No. 14/211,928, filed Mar. 14, 2014, which claims priority to U.S. Provisional Patent Application Ser. No. 61/799,708, filed Mar. 15, 2013, the disclosures of which are incorporated herein by reference in their entirety.

FIELD OF THE DISCLOSURE

The present disclosure relates generally to communications and more specifically to managing network communications.

BACKGROUND

Network architectures consist of layers of protocol of different scope. In general, scope increases with higher layers. The traditional approach to implementing these architectures is to pass incoming PDUs (packets), through stages of processing in each layer. This can entail data copies and task switching and is very inefficient. All implementations attempt to minimize this overhead to the degree they can give the unique nature of the protocols but with limited success. Even with hardware assist, this has led to expensive and complex custom silicon.

A PDU for any layer consists of Protocol-Control-Information (PCI, sometimes referred to as the "header") and user-data. PCI is what the protocol must process; user-data is not understood by the protocol and delivered to the layer above. The layer above has the same structure. The user-data of the layer below is the PCI and user-data of the layer above. Hence we tend to talk about (N)-PCI and (N−1)- or (N+1)-PCI.

In traditional networks, data transfer consists of multiple layers with addresses, CRCs, fragmentation/reassembly, ordering, retransmission, flow control, etc. usually done over 3 or 4 layers of different scope sometimes more. In a router, PDUs must go up through these layers and then back down through different ones. Because all of the protocols in every layer are different, this is complex and expensive.

In multiplexing/demultiplexing situations, each layer combines flows coming down through the layers into fewer flows out the bottom. Flows coming in are demultiplexed into more flows. In a router, a small number of incoming flows are demultiplexed at each layer into different classes of queues that may be handled differently. At the "top" of the router, PDUs are switched to be sent out on different lines than they came in on. So the PDUs are multiplexed on again through a different set of queues. In traditional architectures, there is no way to avoid "sorting" the PDUs through this web of queues.

In most network architectures, it is difficult to change the address that PDUs (packets) are being sent to without losing some packets or in some architectures, such as the Internet, destroying connections. The ability to change addresses is critical for the support of mobility and the efficiency of routing. As a corollary, the task of completely renumbering a network (changing all of the addresses used) is a complex, expensive and disruptive affair, which is to be avoided.

DETAILED DESCRIPTION

The present disclosure describes, among other things, illustrative embodiments of techniques and components for managing communications. Other embodiments are contemplated by the present disclosure.

In one exemplary embodiment, an architecture can be provided and a process can be implemented such that data copying and task switching is avoided or reduced during network communications. This embodiment can include treating each protocol data unit (PDU) as a serial tape to be processed in order. By way of dynamically binding syntax and selecting proper policy based on Connection-endpoint-id (CEP-id) indexing, state vectors can be updated and bindings changed to enable traversing each of the associated layers.

In one exemplary embodiment, an architecture can be provided and a process can be implemented such that multiple stages are avoided during (Error and Flow Control Protocol) EFCP processing and multiplexing. The EFCP protocol comprises DTP (Data Transfer Protocol) messages which primarily contain data to be processed or forwarded, and DTCP (Data Transfer Control Protocol) messages which are primarily used to exchange control information, such as flow control information.

In one exemplary embodiment, address changing can be accomplished through use of multiple address assignment for a single entity. As an example, a Connection-endpoint-id can be utilized that is independent of a source address.

In one exemplary embodiment, an architecture can be provided and a process can be implemented such that peer searching can be performed among networks that are accessible and/or non-accessible by a requesting entity, and a relay can be established to provide for access to an otherwise non-accessible network having a desired application.

Figure 1:
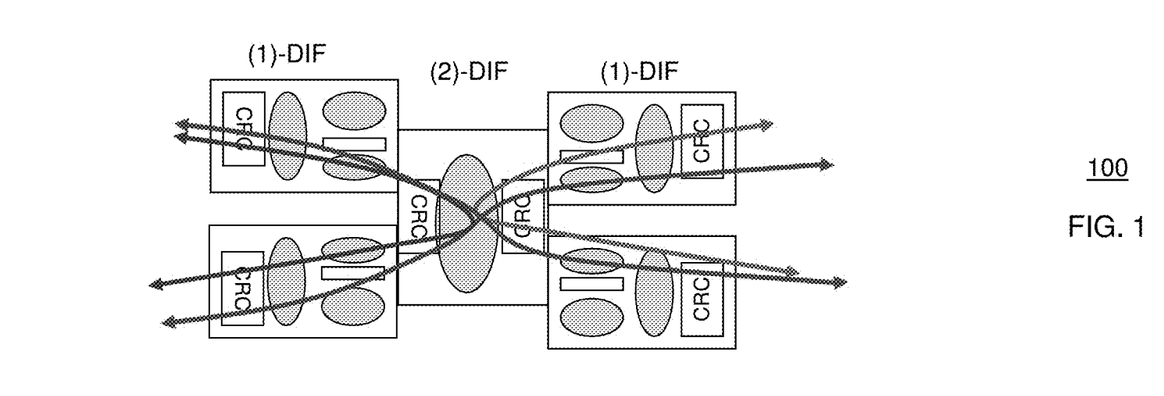
FIGS. 1-8 illustrate a process for managing error & Flow Control and multiplexing in a network environment.

Referring to FIGS. 1-8, an architecture and processor for facilitating EFCP and multiplexing is illustrated. FIG. 1 depicts an interior router 100 with four Interfaces. DIP indicates a protocol processing layer. (The DIFs are on their side and the management side isn't shown). The CRC modules in the 2-DIF are the same module. The arrows indicate possible paths for traffic. The 1-DIF Relaying and Multiplexing Task (RMT) is fairly degenerate and only handles media access. Often, there is no reassembly in the (1)-DIF. Aggregation (if any) operates on the queues of PDUs to be sent, essentially reducing their number. The component labeled CRC may include encryption.

Figure 2:
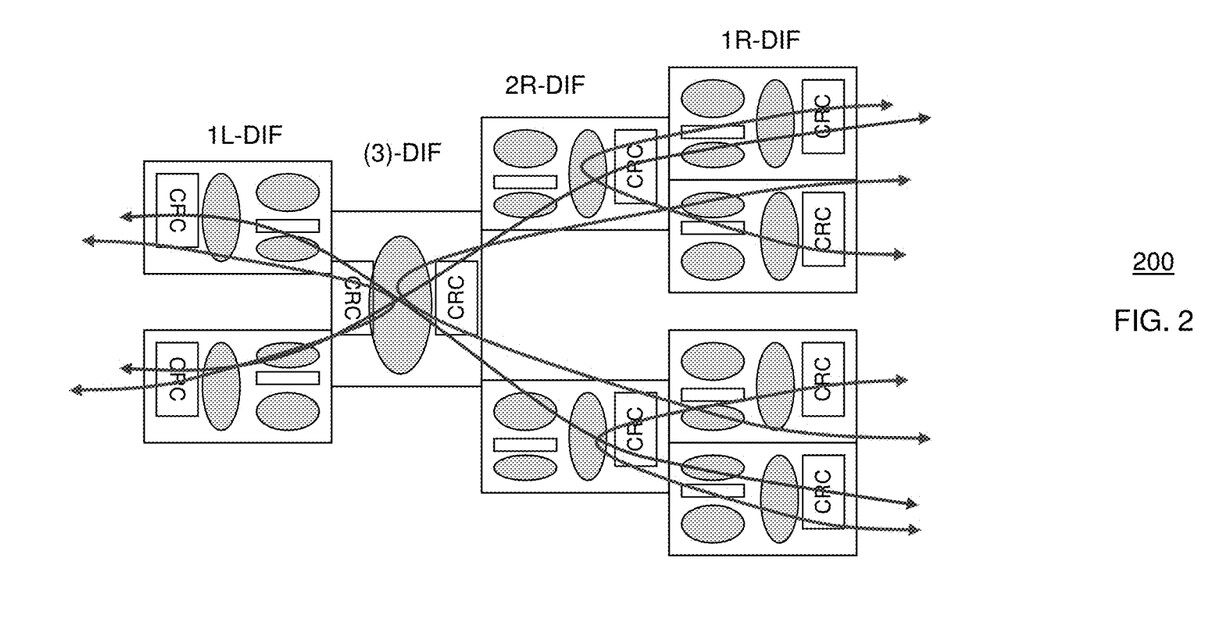

FIG. 2 depicts a border router 200 where 2R-DIFs may exercise flow control (e.g., congestion control). There may be no 3-CRC. "L" and "R" refer to left and right sides of the border router 200, and there could be additional DIFs at each rank. In one embodiment, the 3-RMT sorts PDUs toward their destination, but doesn't queue. In another embodiment, the 2-RMTs only sort as well. The 3-RMT could be replicated to allow parallel sorting of multiple PDUs for faster processing.

Figure 3:
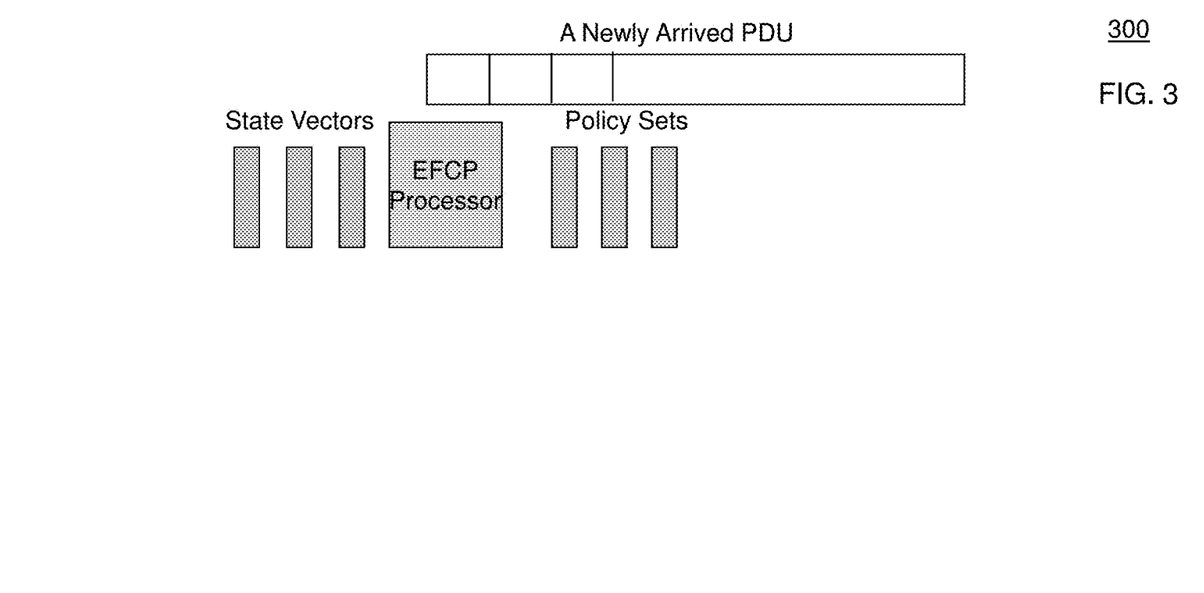

FIG. 3 illustrates processing 300 by an EFCP processor. With a common data transfer protocol for each layer, processing PDUs does not require passing the received message from layer to layer since processing steps are the same for every layer. A single EFCP processor suffices. For each PCI (header), the same state machine can simply switch between policy sets and state vectors for each layer. The PDU can be treated as a tape and the EFCP can be treated as a Universal Turning Machine. By avoiding the passing of PDUs from layer to layer and by sharing an EFCP Processor among layers, this "flattening" of the processing has performance implications, such as smaller implementation and improved CPU cache performance.

Figure 4:
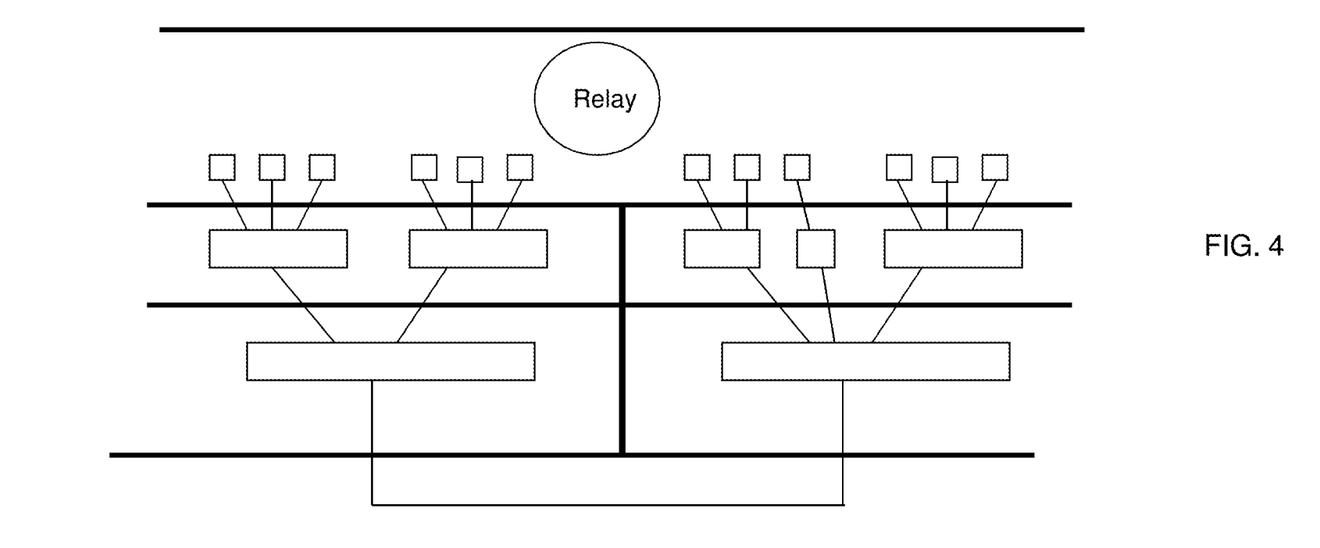

FIG. 4 illustrates how multiplexing can be enhanced. QoS-cube designates a set of specified ranges of Quality of Service parameters such as, but not limited to, delay and latency. One queue per QoS-cube per layer can be assumed. Buffers for all DIFs can be commonly managed. This can enable flattening as well.

Figure 5:
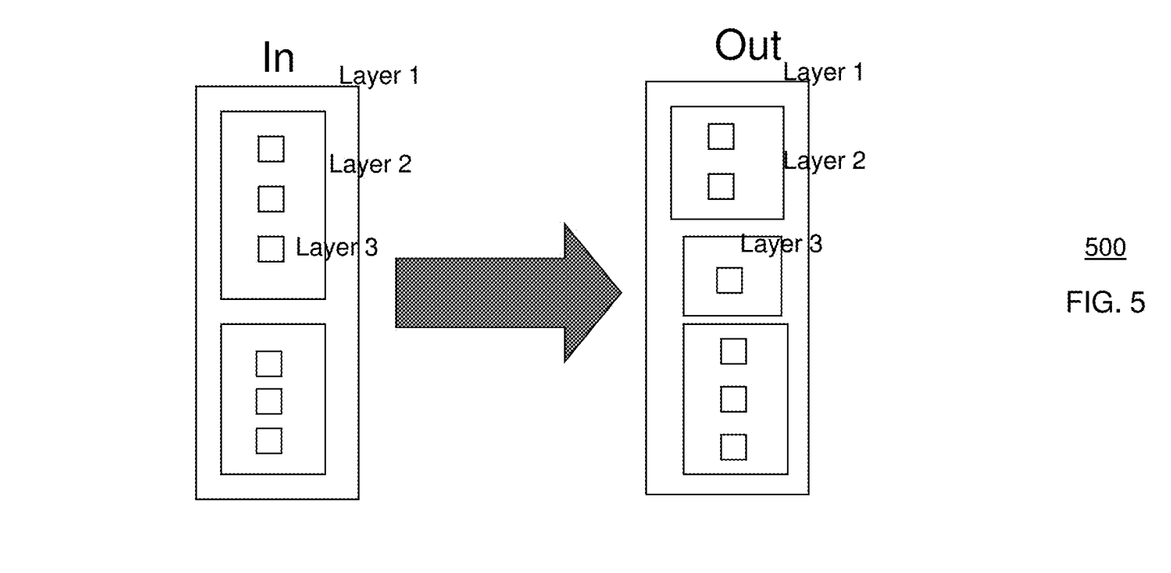

FIG. 5 illustrates process 500 for enhancing layers of multiplexing. Two input queues supplying PDUs from Layers 1, 2, and 3 are depicted, where PDUs after forwarding computation are sent to one of three output queues, the choice of queue determined by the QoS properties assigned to Layers 1, 2, and 3. QoS provided by the router to PDUs passing through it is determined only by output queuing. A router can transfer PDUs in and out, while QoS-cube partitioning is preserved. Flattening of layers results in as many queues at the output as QoS-cubes at the input. Lower layer "queues" translate into affecting sets of queues. Output queues and policies for selection of PDUs from queues for transmission can be utilized for ordering the use of the media.

Figure 6:
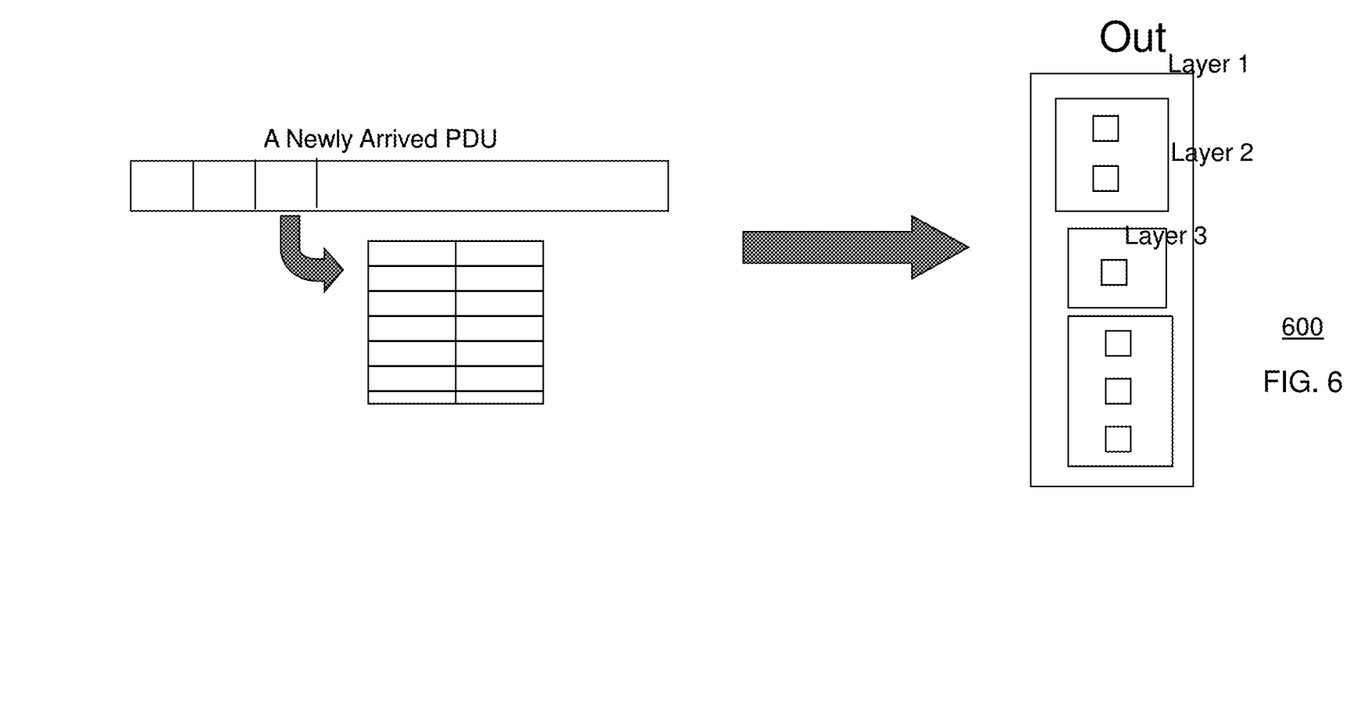

FIG. 6 illustrates process 600 associated with Short-circuit relaying such as determining the outbound queue that an inbound PDU should be sent to, examining PCI from only as many of the protocol layers as necessary to determine the destination, ideally one. There is relaying at only one layer in the stack. Fixed length headers allow looking ahead to find destination address and map to output queue, then do DTP processing. If PCI is encrypted, at least some of it will have to be decrypted to determine the destination queue, otherwise, the PDU can be moved to output locus of processing (NIC) as quickly as possible, i.e., without doing SDU-Protection operations such as validating a CRC or checksum. If the PDU is corrupted it will be discarded eventually anyway.

With respect to router multiplexing, for the inbound side, DTCP flow-control messages can be used to control incoming flow at any layer or layers (as represented by sets of queues). Coarser control (lower layer) may exist but is more responsive (less scope). On the outbound side, the routing and multiplexing component of the layer, RMT, can order the PDUs to be sent on media. If buffer space is getting short, inbound can push back as stated above, using DTCP flow control messages. Flow control at lower layers can control sets of queues. A "rolling push back" can be used with earlier response on lower priority queues at a higher layer, then lower priority at lower layers, and so forth.

Figure 7:
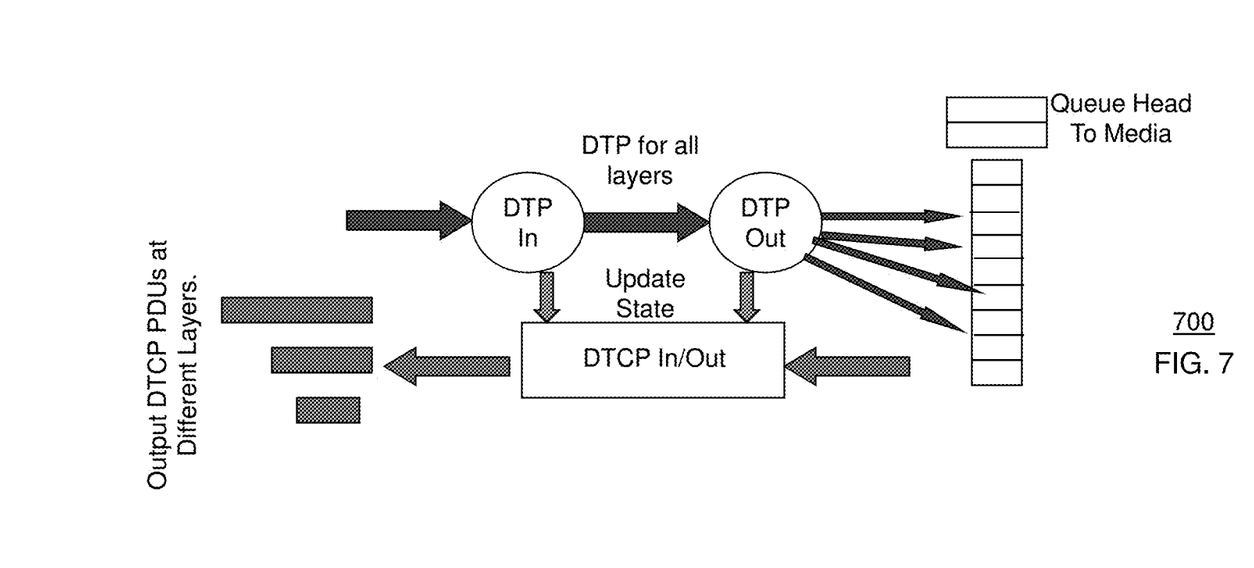

FIG. 7 illustrates process 700. DTP-in and DTP-out are mainly updating the state vectors and formatting or reformatting PDUs for transmission. The same format PDUs may be used in adjacent ranks. DTCP-in/out can receive DTCP PDUs from all layers and can generate DTCP-PDUs to all layers as required. Rolling feedback across layers can be tuned to round-trip-time RTT. PDUs arriving at layer >N will have more variance, there will be less variance at lower N.

Figure 8:
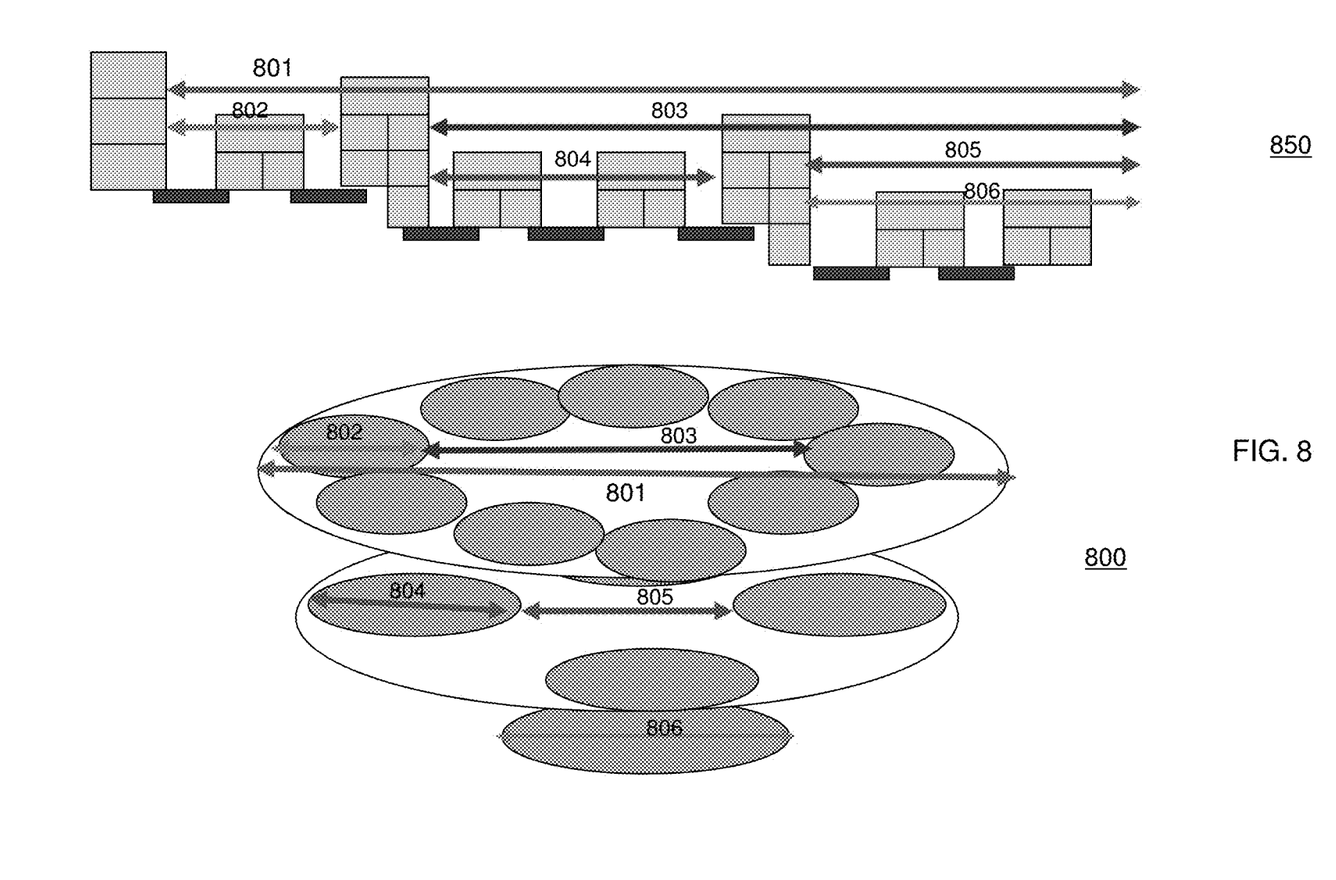

FIG. 8 illustrates schematic diagrams of traffic flow 800 and 850. Relays can insert flow indicators, e.g., Explicit Congestion Notification (ECN) (such as described in R. Jain and K. K. Ramakrishnan, "Congestion Avoidance in Computer Networks with a Connectionless Network Layer: Concepts, Goals, and Methodology" Proc IEEE Comp. Networking Symp. Washington, C. April 1988), to indicate to senders that they are receiving too much incoming data, while hosts and border routers can exert flow control. ECNs can have longer response time. FIGS. 800 and 850 are two views of the same configuration. Limitations of space show only half of 800, which is symmetrical. Arrows 801-806 in FIGS. 800 and 850 represent the same flows. Flow 805 is provided by flow 806 and supporting entities, flow 803 is provided by flows 804 and 805 and supporting entities, and flow 801 is supported by flow 802 and 803 and supporting entities.

In one exemplary embodiment, in a recursive architecture, data transfer for each layer consists of the following: SDU Protection (data corruption detection, e.g. CRC, encryption, etc.), addressing, flow-identification, multiplexing/demultiplexing, a Data Transfer Protocol (DTP) providing fragmentation/reassembly, ordering, delimiting and Data Transfer Control Protocol (DTCP) consisting of retransmission control and flow control.

In a recursive architecture, the protocols are the same because the design separates mechanism and policy. The differences have been localized to a few procedures. This allows considerable simplification in protocol processing. There are two different parts of this: The Error and Flow Control (EFCP) part, as implemented by DTP and DTCP, applied to each flow, and the multiplexing and demultiplexing part.

Associated with each EFCP flow is a state vector, $ST_k$, that maintains information needed between or kept between PDUs. Consider a vector $P_{jk}=(p_1, p_2, \ldots p_n)$ that consists of the policies to be applied to a given flow k for a given layer, j. To accommodate differences in syntax, we utilize the well-established use of an abstract syntax with multiple concrete syntaxes $S_k$ to make the protocol invariant with respect to syntax. The main protocol procedures for all layers are the same. Rather than pass PDUs from layer to layer, the implementation treats each PDU as a serial tape to be processed in order. The implementation takes a PDU as input and for each layer dynamically binds, the $S_k$ syntax, and indexing on the source Connection-endpoint-id (CEP-id) selects the proper $P_{jk}$ policy set, processes that PCI and updates the necessary state vector. Finishing the first PCI, the implementation changes bindings to $S_{k+1}$, $P_{k+1,j}$ and so on up and steps through the layers. All data copies and task switches are avoided.

By way of analogy, we are treating the implementation of the mechanisms of the protocol as a Universal Turing Machine, which is switching between Turing Machines defined by the different state vectors, concrete syntaxes and policy vectors executes the input tape, the PDU, where each successive PCI in the PDU is processed by a different Turing Machine. (There may be some symmetry if the network technologies are the same, i.e. to process an incoming PDU and send it back out would invoke (TM1, TM2, TM3, TM2, TM1) whereas if the technologies were different it might be (TM1, TM2, TM3, TM4, TM5).

In a recursive architecture, there are simplifications that can be made. The ultimate goal is to get the PDU to the output queue to be sent out on another line. Given that all the protocols are the same and the syntax is known, the destination address is easily located in the PCI that is routed, and sorted into the queues defined in the top layer of the router (where the finest granularity exists) for sending down through the layers to each out-going line. These "sending queues" are the queues used to schedule PDUs for sending on the media. The only effect of the queues at the other layers is flow control. The effect of the intervening layers is to turn off or on sets of the sending queues according to which queues they would go through. Hence, if at one of these layers PDUs from queues 3 and 4 in the top layer are multiplexed on to queue A at the layer below and flow control at the lower layer indicates stop sending by blocking queue A, the action would be to block sending queues 3 and 4, i.e., the action is on the set defined by the multiplexing.

When a PDU arrives from the network, it is known by this router at what layer relaying occurs relative to the physical media. Therefore, the router knows how many encapsulated PCI instances occur between the beginning of the PDU and the PCI with the address to be used for the relaying decision. The PCI for each layer is fixed length for each layer and must be known but need not be the same length for each layer. Therefore, the address used for relaying can be easily located by computing the sum of these lengths, and knowing the offset with the PCI where the address is to make the relaying decision. Any SDU protection in the PCI is then processed. If processing indicates that the PDU is corrupted the PDU is discarded, otherwise EFCP for all layers is executed on the PCI to update state vectors and the PDU is posted to the appropriate queue as defined by the layer where relaying occurs. PDUs from these queues are then scheduled for sending according to their definition, e.g., priority. Updating the state vectors while processing the EFCP PCI may indicate that flow control bounds have been encountered that imply that sets of queues should be blocked. Subsequent EFCP flow control PDUs will unblock the sets of queues as appropriate. This collapses the stages of processing in a router from 6-8 stages to a single stage. Furthermore the logic and processing can be put into silicon. The above example has been described with respect to a recursive network architecture, however, the exemplary embodiments or parts thereof can be utilized with various types of network architectures including recursive and non-recursive.

In another embodiment, a change of address of the process to which PDUs are directed is accomplished without the loss of data or connections, such as in a Recursive Inter Network Architecture (RINA). The same procedure can be used to renumber a network simply, easily and at little or no cost. Identifiers bound to most objects, such as in RINA, can be unambiguous rather than unique.

The exemplary embodiment can utilize the convention from ISO 7498-3, the disclosure of which is hereby incorporated by reference. An identifier unambiguously identifies an object if the object can have more than one identifier. An identifier uniquely identifies an object if the object can have one and only one identifier. Application Processes have Application-Process-Names. IPC Processes are Application Processes that are members of a DIF. The names of IPC Processes can be taken from the same name space as other Application Processes. The IPC Processes that are Members of a DIP can be assigned a synonym from a name space whose scope is limited to the DIF and may be structured to facilitate its use within the DIF. These synonyms have traditionally been called addresses.

The procedure for name change is as follows: Let us assume that NMS is the Network Management System responsible for a given layer. In what follows, we will not distinguish between an action by the NMS and an action by some proxy acting for the NMS. Lets define the following terms: A is the IPC Process whose name is to be changed. A-App-name is its Application Name. A-old is the address assigned to A at the beginning of the procedure and a-new is the new address being assigned to A by this procedure. Bi are IPC Processes that A has DTP flows with currently, i.e., ports are allocated and bi-addr are the addresses of the Bi IPC Processes.

It is assumed that all address assignments within the layer have a lifetime and must be renewed by the NMS within a time, Ta. Routes being advertised by an IPC Process have a lifetime of Tr. If a route advertisement for this destination is not received by Tr, then the route is deleted from the routing table. Tr can be chosen to be a multiple of normal route update periods. In general, Tr<<Ta.

The NMS determines that the address assigned to an IPC Process should be changed. It assigns a-new to A in addition to a-old. A now has three identifiers within the network for it: A-Appl-name, a-old, and a-new. A-Appl-name is known globally, while a-old and a-new are only known within the layer. The NMS will not refresh a-old. The IPC-process immediately starts using a-new as the source address in any PDUs sent via DTP flows originating from A. In one embodiment, once this occurs, and the other ends of the flows start using a-new, no PDUs with a-old will exist in the network after 2 Maximum Packet Lifetimes, all older PDUs will have arrived or have been discarded. Only PDUs with a-new exist. If A has any directory entries that map application names to a-old, it updates the directory with a mapping to a-new. In a second embodiment, A does not delete the mappings to a-old. A also causes an RIB update (routing update) to occur by advertising that it is on the path to a-new. A ceases advertising that it is a route to a-old.

When any Bi receives a DTP PDU with a destination address of bi-addr, it checks to see if the source address in the PDU has changed. If it has changed it replaces the old source address value with the new value in the state vector for this flow (or it simply saves in the state vector the source address from each arriving PDU (after ordering)) and proceeds to use it as the destination address on all those flows. Over time, the routing updates will spread over the network. The directory updates will propagate with the new address mapping. The old address, a-old, will disappear.

The same procedure can be used to renumber an entire network. This will work even if all nodes are renumbered at the same time. The number of active routes will increase during the transition, but will then settle down to the new configuration.

In another exemplary embodiment, an Application A on system Alpha should not need to know what network (or layer) the Application B on system Beta that it wants to talk to is on. (Where the application names A and B are taken from a name space that encompasses several networks.) Hence, when a system has several networks, N1, N2, ... etc. a functional component X is required to find which network supports the desired application B. In the system Beta, there is a similar functional component X. In fact, this functional component X will exist at all systems on all of the networks. It is also the case that the complement of networks available at Beta may be different than those at Alpha, or at other systems. If the functional component X at Alpha cannot find the requested application B on any of its networks, it can use a protocol to ask other Xs on other systems, if they have networks which support B. If one, say Delta, is found that supports B, and Alpha has a lower layer in common with layer supporting B, then Alpha can join this "remote" network to gain access to B. Or, if there is no common lower layer, then a new top layer can be created that includes Alpha, Delta, and Beta, so that A can establish communication with B. In this way, communication can be established between any two applications on all networks using the same Application Name Space. Note that this does not work for the Internet, where URLs are paths to applications rooted on their network address. Here application names are not rooted on any other identifier.

This enables communication between applications not normally on the same network; enhances compartmentalization and hence security; and obviates the need for large address spaces and the potential scaling problems that ensue from such large name spaces. Furthermore, the functional component X can be part of a system or an application. Thus, when joining another network or creating a new layer, one could choose whether one's network joined, e.g., your entire home network; your computer joined, or just your application (e.g., browser joined). This would greatly reduce the exposure to the outside world (and enhance security).

In another exemplary embodiment, in some networking situations, one transitions from one address space A, to another B, and then back to A. Let us call the routers where this transition occurs, Border Routers (BRs). Suppose a PDU destined for address d leaves address space, A, at a, in border router G, and re-enters address space A at a' in border router H. To the routing using address space A, a in BR G and a' in BR H are one hop apart. At BR G, the PDU is encapsulated in a new PDU with source address b, and destination b' in BR H. However, in terms of address space B, b in BR G and b' in BR H are several hops away. At a, the PDU destined for d is encapsulated in a new PDU using address space B, the new PDU has destination address b' and source address b. (a and b are addresses in BR G; and addresses a' and b' are addresses in BR H where the PDU destined for d re-enters routing under Address Space A.) Let us suppose that with the subnetwork of routers using address space B, there is more than one BR through which packets could be routed to get to destination d in address space A.

A problem can occur when BR H goes down, PDUs in-route between BR G and BR H cannot be re-routed by the routers in address space B, because the only way out it knows is b'. To avoid this problem in today's networks, path discovery is required which is known not to scale. The exemplary embodiment can avoid this situation. We define so-called anycast sets, which are named sets of addresses with a rule, such that when the name of the set is resolved, one element of the set is chosen. For this application of anycast, we define anycast named sets in address space A that contain the addresses of multiple BRs that all have paths to d and other addresses on the same subnet with the rule that chooses the "nearest" one. This set is also given to layer administering address space B, it creates a similar anycast named set consisting of the addresses b's with the same rule. This rule is evaluated each time the forwarding table is updated and is used to create an entry in the forwarding table. Now, when the BR being used to route to d fails, the anycast rule yields another address in b that is an alternate path and PDUs continue to flow using the alternate path. Path discovery is avoided. The solution presented scales. Failover is immediate and in much less time than a full routing update. A full routing update calculation is unnecessary.

Figure 9:
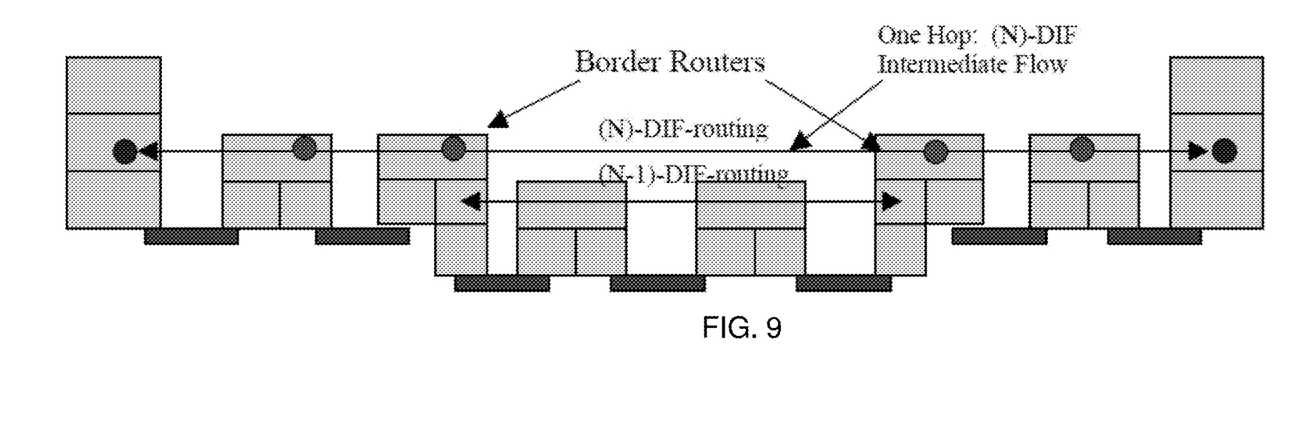
FIGS. 9-11 illustrate techniques for managing communications.

The use of anycast sets is associated with the following. If this form of recursive routing is approached naively, routing across the "holes" will make the routing somewhat connection-like. To the PDUs being routed in the lower layer, their source and destination are the border routers they were routed through. If one of these border routers should fail or if the path to it should fail, the lower layer would not be able to compute an alternate path. The traffic would have to be re-routed from the source border router. This is not as bad as traditional connection-based technologies, where a failure results in the entire flow being lost. Here only the portion of the flow over the hole is lost. However, this could lead to unacceptable delays in responding to and recovering from a failure. Clearly, not acceptable. But there is a straightforward solution. The problem is that the (N)-IPC-Process of a border router is managing flows one hop over the hole. It needs to indicate to the (N−1)-DIF alternate paths for its intermediate flows. When it calculates the routes for some collection of destinations in the (N)-DIF, it will find a preferred next hop and probably several alternatives. These alternate paths may be through border routers to the same subnet or border routers to nearby subnets. To the border router, these are all one hop away. Using the output of this calculation the border router constructs whatevercast addresses with a rule that indicates the conditions for choosing a member of the whatevercast set, i.e. the preferred exit border routers depending on the outcome of the rule. If the chosen exit point fails or becomes overloaded, the forwarding table calculation in the (N−1)-DIF will simply pick another exit point. All of this can be done automatically without management intervention and without requiring a route calculation. FIG. 9 illustrates where the (N)-DIF RMT creates an everycast set to indicate alternate paths to the (N−1)DIF.

This does not imply that return traffic follows the same path. All of the border routers at this level are doing the same calculation and creating their own everycast sets. The return PDUs are being routed like any other to their destination. The only PDUs that have to "come back" to a border router are those addressed to it, e.g., for management purposes. Given that only border routers surround a "hole" implies that all flows across these "holes" will be whatevercast flows. In fact, this would be a common characteristic of "provider" DIFs. One would expect many whatevercast sets to be configured as a primary choice with alternates, or spreading the traffic over a few exits. If the (N−1)-DIF was especially unreliable, the whatevercast set might actually send multiple copies to increase the probability that one arrived. The collection of everycast sets over a given hole will have considerable overlap. Given that these sets are being created by a provider DIP and are likely under a single management organization makes it feasible for the rules for all sets around a hole to contribute to a resource allocation policy, and also include automated response to various emergencies or special events.

Figure 10:
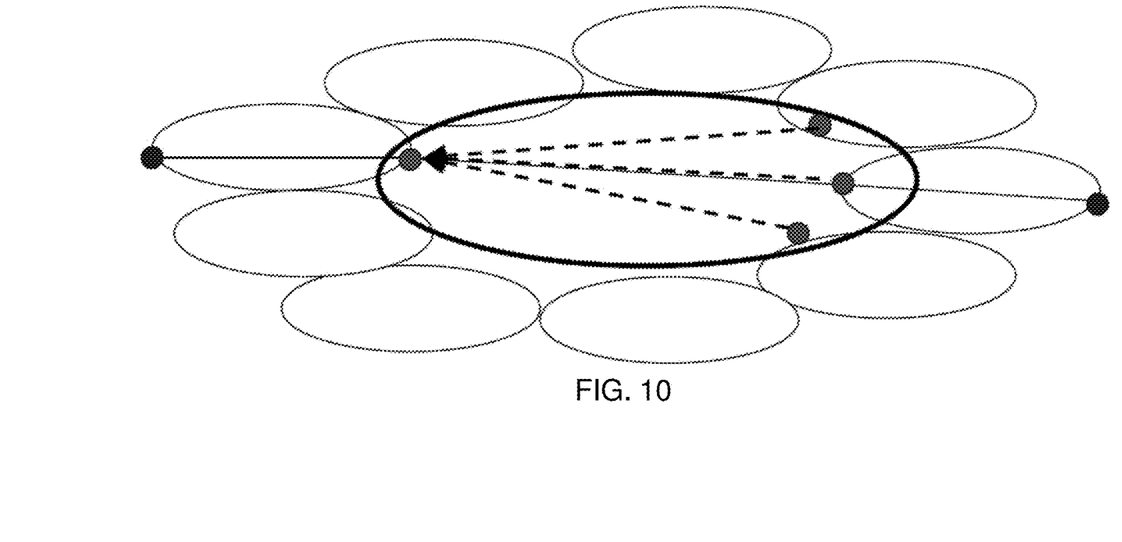
Figure 11:
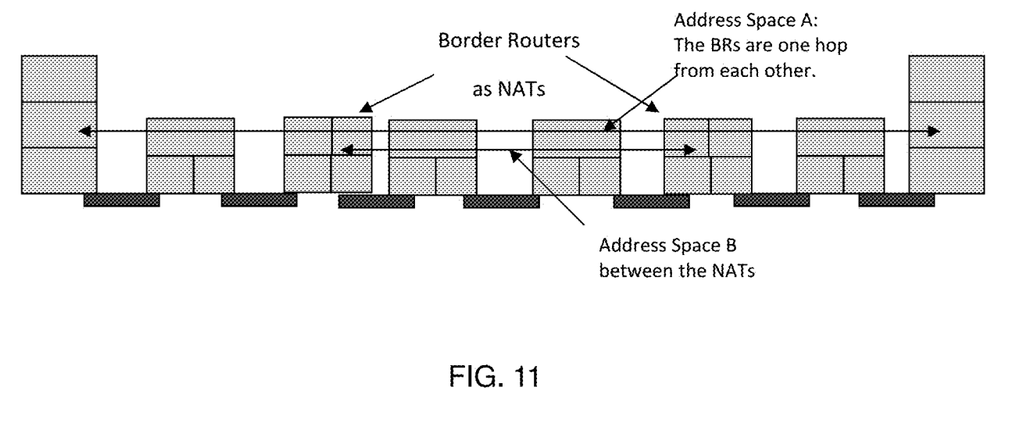

The DIF structure allows traffic engineering and congestion control to be exerted at several points depending on the provider's preferences. FIG. 9 depicts a deployment of layer entities demonstrating the flows among entities at different layers. As noted in the previous parts of this specification: flow control is a feedback mechanism collocated with the resource being controlled, whereas, congestion control is a feedback mechanism not collocated with the resource being controlled. Flows within the provider DIFs can be used to allocate resources to different classes of service. Congestion control might be imposed between hosts and the first router (traditional ingress flow control), or between hosts and border routers or between border routers across the hole. This provides wide-ranging possibilities for elastic congestion control within the network without resorting to rigid connections or hop-by-hop approaches. The lower layers would be engineered to have higher density traffic and hence more deterministic behavior allowing better traffic engineering in the upper layers. Furthermore, whatevercast names can be used to spread load over multiple routes across the hole. As we saw above, the (N)-DIF border routers are in effect creating an intermediate flow across a central hole. There is no reason that flow control cannot be exerted on these intermediate flows to better manage the traffic such as flow control exercised over intermediate flows while allowing (N−1)-subnets to be connectionless internally. FIG. 10 illustrates an everycast set with flow control between its border router and the members of the set. The intermediate flow is created just like any other. The deeper in the network these flows are, the longer-lived they will tend to be, sometimes very much longer lived, i.e., days or weeks or even longer. Any border router that receives PDUs can send flow control information on its intermediate flow. The border router knows the source from the source address, and adjusts its behavior accordingly. Note: that flow control here is not "counting buffers" but in some sense "adjusting the spigot." The accuracy of credits is less important than the resulting rate and burst pattern, implying that rate-based flow control may be useful. Concerns about deadlock are not an issue. If an element of the set does not receive any traffic and does not send control messages for a period the state can be simply discarded. If the receiver expects traffic and isn't seeing it, it can simply send more credit. If it suspects it might have too much outstanding credit because the rate of arrival is too high, it can reduce the credit. Traditionally, congestion is treated as a failure of the graph. It isn't. The graph is intact, it is just a little clogged. Using the combined whatevercast definitions and flow control on the intermediate flows, there is an opportunity to have a resource allocation strategy within the network, where the forwarding table update re-evaluates the whatevercast rules, and alters the forwarding table, but does not do a routing calculation. FIG. 11 illustrates a configuration using Network Address Translators (NATs).

Additionally, elements and components described herein may be further divided into additional components or joined together to form fewer components for performing the same functions. Any embodiments in the US patents and the US Patent Applications listed in the tables below can be used or combined in whole or in part with the subject disclosure.

All sections of the US patents and the US Patent Applications that follow below are incorporated herein by reference in their entirety:

methods discussed above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Figure 12:
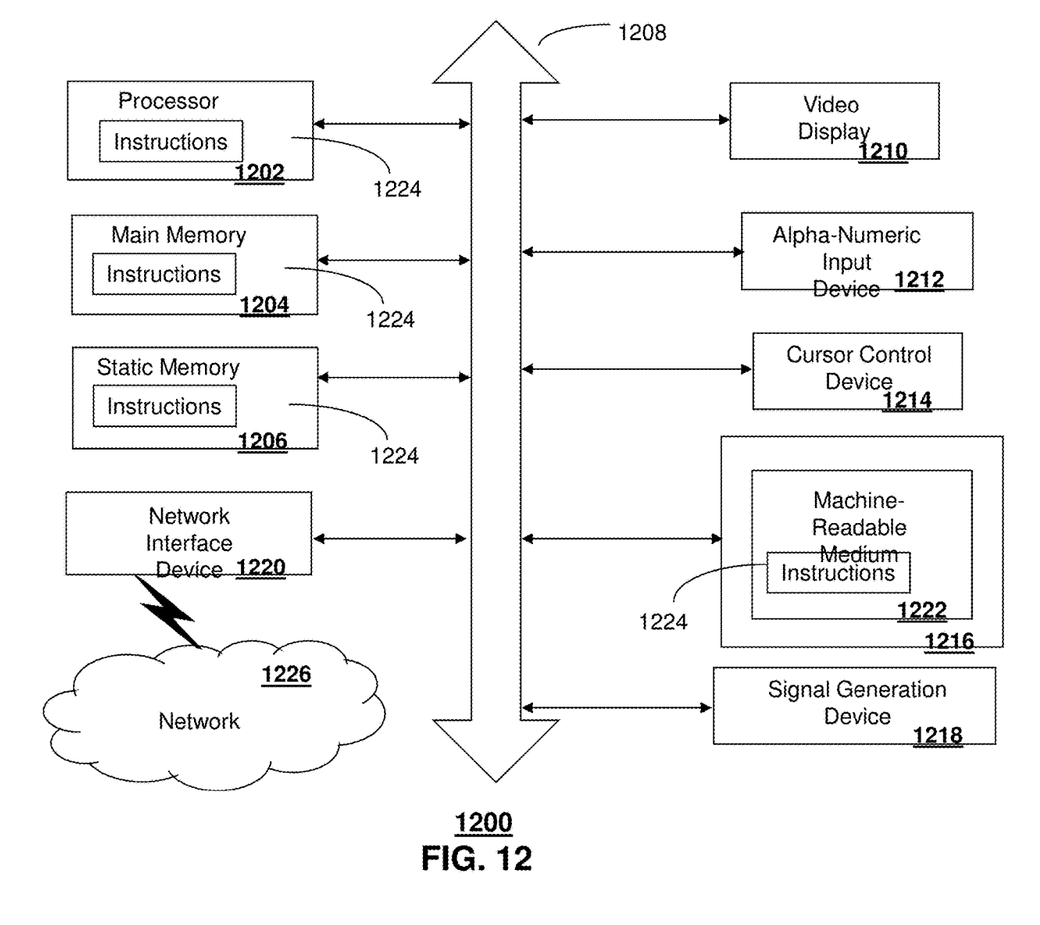
FIG. 12 is a diagrammatic representation of a machine in the form of a computer system within which a set of instructions, when executed, may cause the machine to perform any one or more of the methods discussed herein.

The computer system 1200 may include a processor 1202 (e.g., a central processing unit (CPU), a graphics processing unit (GPU), or both, a main memory 1204 and a static memory 1206, which communicate with each other via a bus 1208. The computer system 1200 may further include a video display unit 1210 (e.g., a liquid crystal display (LCD), a flat panel, or a solid state display). The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220.

The disk drive unit 1216 may include a tangible computer-readable storage medium 1222 on which is stored one or more sets of instructions (e.g., software 1224) embodying any one or more of the methods or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute tangible computer-readable storage media.

| FILE # | TITLE | FILING DATE | NUMBER | APPLICATION # |
|---|---|---|---|---|
| 1900-0001 | PARAMETERIZED RECURSIVE NETWORK | Mar. 5, 2004 | 8103797 | 10/546,018 |
| 1900-0001-01 | Parameterized recursive network architecture with topological addressing | Dec. 19, 2011 | 8352587 | 13/329,724 |
| 1900-0001-03 | PARAMETERIZED RECURSIVE NETWORK ARCHITECTURE WITH TOPOLOGICAL ADDRESSING | 13/723,654 | | 13/723,654 |
| 1900-0002 | MUTIPLEXING AND CONGESTION CONTROL | 10/546,066 | 8180918 | 10/546,066 |
| 1900-0002-01 | Multiplexing and congestion control | 13/469,131 | | 13/469,131 |

FIG. 12 depicts an exemplary diagrammatic representation of a machine in the form of a computer system 1200 within which a set of instructions, when executed, may cause the machine to perform any one or more of the Dedicated hardware implementations including, but not limited to, application specific integrated circuits, programmable logic arrays and other hardware devices can likewise be constructed to implement the methods described herein.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 1222 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1200.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Additional information describing the exemplary embodiments is included in the attached Appendix A which is incorporated by reference herein.

What is claimed is:

1. A method comprising:
   determining, by a system including a processor, an address change is desired for an Inter-Process Communication (IPC) process, wherein the IPC process has been assigned a first address, wherein the first address is only known in a layer, wherein the IPC process has an application name that is known globally, wherein the determining includes processing Protocol Control Information (PCI) associated with the IPC, and wherein the processing of the PCI includes decryption of a first portion of the PCI if the PCI is encrypted;
   assigning, by the system, a second address to the IPC process, wherein the IPC process does not delete mappings to the first address, wherein the IPC process utilizes the second address as a source address in any Data Transfer Process (DTP) flows originating from the IPC process; and
   responsive to the assigning the second address to the IPC process, disabling, by the system, renewal of the first address assigned to the IPC process, wherein the disabling of the renewal of the first address causes a route for the first address to expire in a routing table.

2. The method of claim 1, wherein the IPC process has DTP flows with another IPC process, and further comprising determining if the source address in a Protocol Data Unit (PDU) has changed responsive to receiving the PDU with a destination address of another IPC process.

3. The method of claim 2, further comprising performing address value replacement responsive to a determination that the source address in the PDU has changed.

4. The method of claim 1, further comprising causing a routing update to occur by advertising associated with a path to the second address.

5. The method of claim 1, wherein the second address is only known in the layer.

6. The method of claim 1, further comprising updating a directory with a mapping to the second address responsive to a directory entry that maps another application name to the first address.

7. The method of claim 1, further comprising ceasing advertising as a route to the first address.

8. A method comprising:
executing, by a system including a processor, Service Data Unit (SDU) protection associated with a Protocol Data Unit (PDU) of a network comprising multiple layers; and
responsive to monitoring for a failure associated with the SDU protection:
discarding, by the system, the PDU when the failure associated with the SDU protection is detected; and
responsive to detecting a lack of the failure of the SDU protection:
executing, by the system for all of the multiple layers of the network, Error Flow Control Protocol (EFCP) on Protocol Control Information (PCI) including at least a portion of the PDU, wherein the executing includes processing the PCI, and wherein the processing of the PCI includes decryption of a first portion of the PCI if the PCI is encrypted; and
scheduling transmission of the PDU according to priority.

9. The method of claim 8, wherein the network includes a non-recursive network architecture.

10. The method of claim 8, wherein each Protocol Control Information (PCI) associated with each layer of the multiple layers of the network comprises a same length.

11. The method of claim 8, further comprising updating a state vector associated with the PDU according to the executing of the EFCP.

12. The method of claim 11, further comprising blocking a transmission queue according to the updating of the state vector.

13. The method of claim 8, wherein the SDU protection comprises cyclic redundancy checking, an error-correcting code that provides an error indication if the error is not correctable, or a combination thereof.

14. A system comprising:
a processing system including a processor; and
a memory that stores executable instructions that, when executed by the processing system, facilitate performance of operations, comprising:
accessing a first Protocol Data Unit (PDU) as an input of a network;
dynamically binding a syntax associated with the first PDU for each layer of a network;
selecting a policy for the first PDU based on a connection-endpoint-id value that is independent of a source address associated with the first PDU;
processing Protocol Control Information (PCI) including at least a portion of the first PDU, wherein the processing of the PCI includes decryption of a first portion of the PCI if the PCI is encrypted;
updating a state vector based on the processing of the PCI;
changing bindings to traverse different layers of the network; and
blocking a first sending queue at a first layer of the network responsive to the updating of the state vector, wherein the first sending queue comprises a plurality of sending queues at a second layer of the network that are multiplexed for sending data at the first layer.

15. The system of claim 14, wherein the operations further comprise:
locating a destination address associated with the PDU; and
switching the PDU to an outgoing line processing via a network interface device.

16. The system of claim 14, wherein the operations further comprise allocating connection endpoint identifiers.

17. The system of claim 14, wherein the PCI comprises a packet header, and wherein the accessing of the PDU includes identifying a destination address from the PCI.

18. The system of claim 14, wherein the operations further comprise executing SDU protection computation associated with another PDU.

19. The system of claim 18, wherein the operations further comprise:
discarding the other PDU responsive to a failure associated with the SDU protection or executing Error Flow Control Protocol (EFCP) for all layers of the network on another PCI of the other PDU responsive to a lack of the failure of the SDU protection.

20. The system of claim 18, wherein the operations further comprise:
posting the other PDU to a corresponding queue as defined by a layer associated with relaying of the other PDU; and
scheduling the other PDU for sending according to a priority.

* * * * *